UNITED STATES PATENT OFFICE.

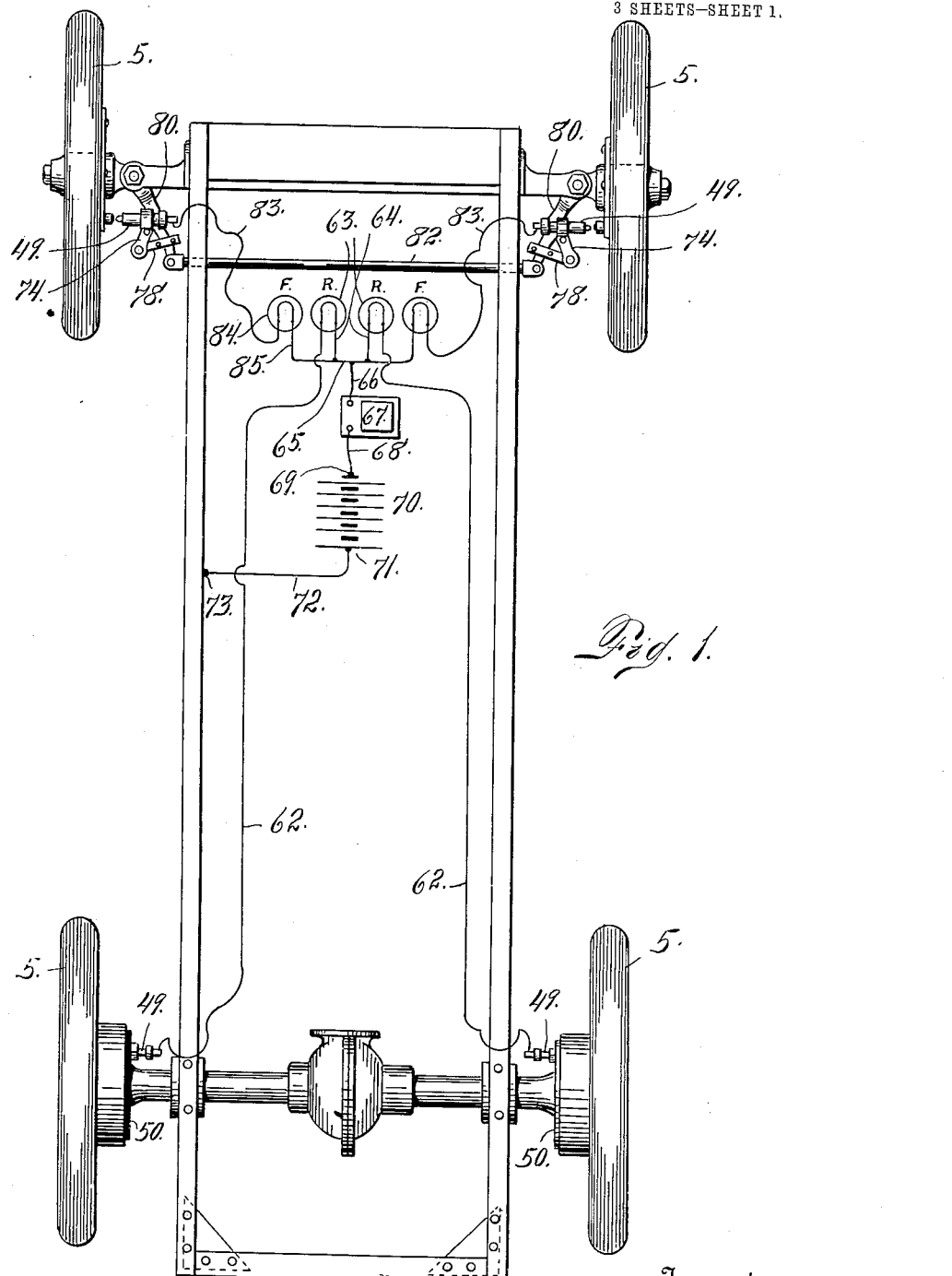

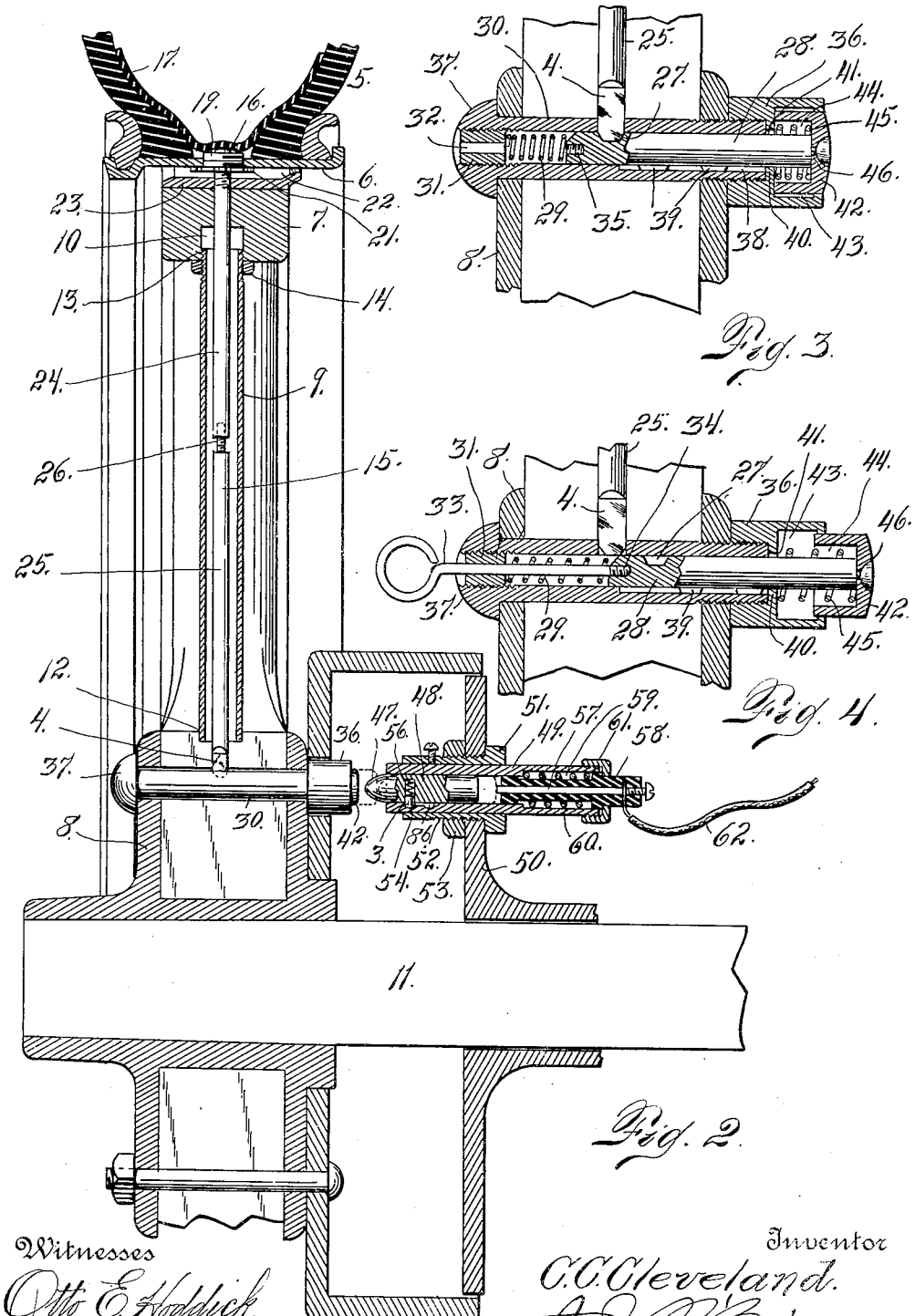

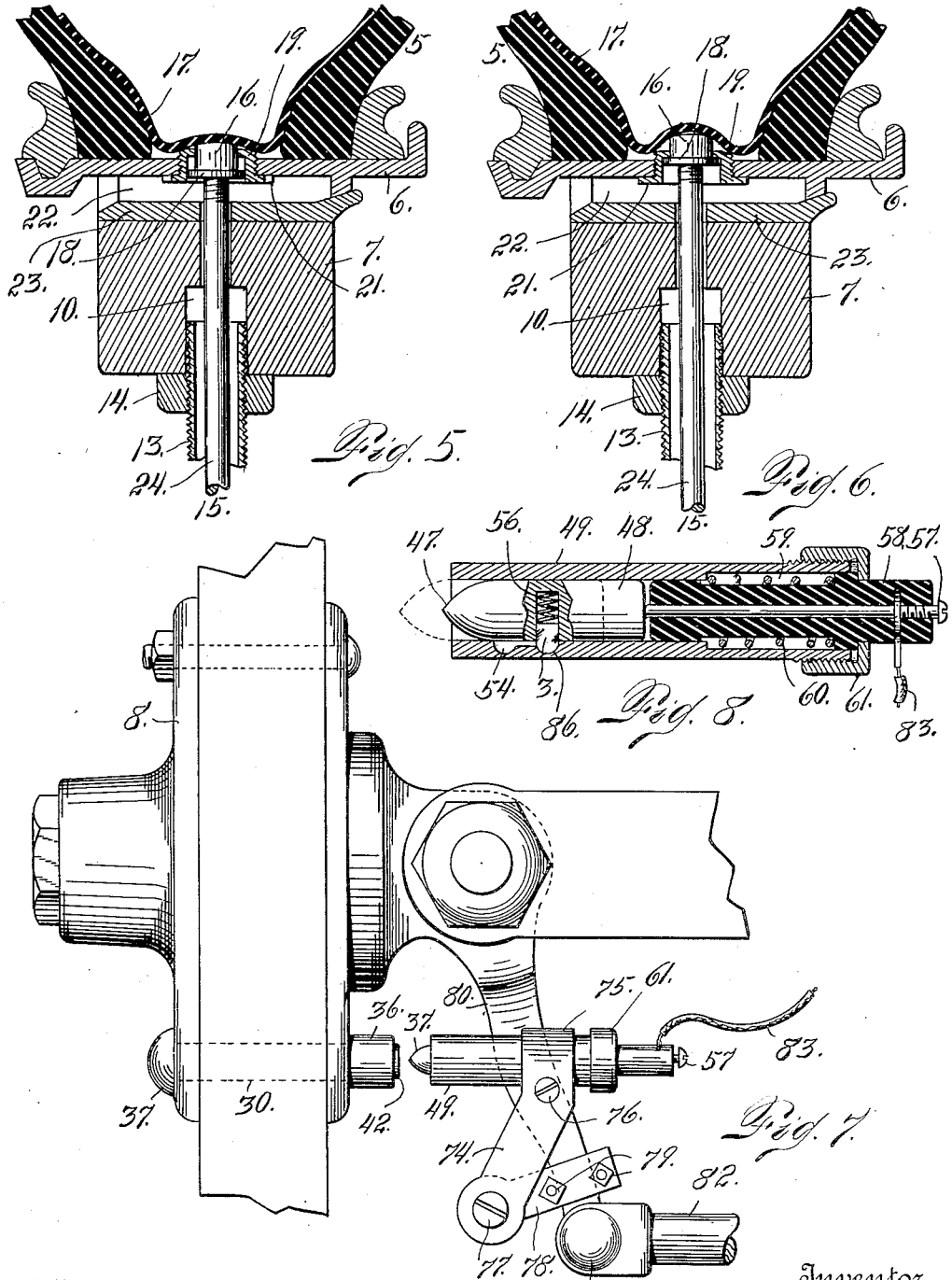

CHARLES C. CLEVELAND, OF BOULDER, COLORADO.

TIRE-PRESSURE INDICATOR AND ELECTRIC SIGNAL.

1,117,329.  Specification of Letters Patent.  Patented Nov. 17, 1914.

Application filed May 6, 1912, Serial No. 695,336. Renewed March 28, 1914. Serial No. 828,098.

*To all whom it may concern:*

Be it known that I, CHARLES C. CLEVELAND, citizen of the United States, residing at Boulder, county of Boulder, and State of Colorado, have invented certain new and useful Improvements in Tire-Pressure Indicators and Electric Signals; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in tire pressure indicators and signals, my object being to provide a device which shall automatically notify the user of the automobile or other pneumatically tired vehicle that the tire has become soft or partially deflated.

The object to be accomplished by a device of this character is to avoid the possibility of running a machine for a considerable time with a tire sufficiently soft to result in serious injury to the tire before its condition is discovered.

In my improved construction, each wheel of the vehicle is equipped with a rod which extends from the hub of the wheel to the tire, its outer extremity bearing against the inner tube of the pneumatic tire. This rod has a limited longitudinal movement within a tube interposed between the rim and the hub of the wheel. The inner extremity of the rod normally engages a plunger which is acted on by a spring under sufficient tension to actuate the plunger when unlocked by the outward movement of the rod.

The movement of the plunger, when released, acts on a contact mounted in a stationary member adjacent the hub of the wheel, the extremity of this contact normally protruding sufficiently to be engaged by the plunger when the latter is extended. The shape of the normally protruding extremity of the contact is such as to cause the plunger, as the wheel turns, to move the contact inwardly to engage with an insulated electrode whereby an electrical circuit is closed in which a signal is located. This signal may be either visual, audible or both, as may be desired.

Having briefly outlined my improved construction, I will proceed to describe the same in detail, reference being made to the accompanying drawing in which is illustrated an embodiment thereof.

In this drawing: Figure 1 is a top-plan view of the running-gear of an automobile equipped with my improved construction. Fig. 2 is a sectional view cutting a wheel and hub equipped with my improvement, shown on a larger scale. Fig. 3 is a fragmentary, sectional, detail view taken through the hub where the plunger is located, the parts being shown on a still larger scale. Fig. 4 is a similar view showing the plunger in its extended position and illustrating a tool for restoring it to its normal position. Fig. 5 is a fragmentary sectional view cutting the tire and rim where my improvement is located, the parts being shown on a larger scale than in Fig. 2. Fig. 6 is a similar view, the rod, however, being projected outwardly whereby it is caused to indent a soft inner tube. Fig. 7 is a view illustrating the manner of applying this device to a forward wheel of a vehicle. Fig. 8 is a detail partly in cross section of the make-and-break device showing the parts in position to make electric connection.

The same reference characters indicate the same parts in all the views.

Let the numeral 5 designate the tire, 6 the tire-rim, 7 the felly, and 8 the hub of the wheel mounted on the rear axle 11 of a vehicle. Mounted at its outer extremities in the felly and hub is a tube 9, the felly and hub being provided with recesses 10 and 12 respectively which the ends of the tube engage. The recess 10 is sufficiently deep to permit the insertion of one end of the tube while its opposite end is outside of the hub. The outer end of the tube is threaded as shown at 13 and a nut 14 is applied thereto. As this nut is screwed against the felly, the tube will be projected inwardly causing its inner extremity to engage the recess 12 of the hub. Through this tube passes a rod 15, one extremity of which is provided with a head 16 which engages the inner tube 17 of the tire. Adjacent the head 16 is a collar 18 slightly larger than the head and which has a limited movement in a sleeve 19 which is threaded into a demountable rim 6 of the wheel. This screw sleeve has a flange 21 extending into a space 22 between the rim 6 and a band 23 applied to the felly. The upper extremity of the rod 15 is threaded into the head 16 whereby the rod may be detached from the said head to permit the removal of the rim 6 in a lateral direction.

The rod 15 is composed of two members 24 and 25 having a threaded connection, as shown at 26, whereby the rod may be adjusted lengthwise to compensate for variation in the diameter of wheels.

The inner extremity of the rod is preferably flattened as shown at 4 and adapted to enter a recess 27 formed in a plunger 28 which is acted on by a spiral spring 29 located within a hollow bolt 30. One extremity of the spring 29 bears against a plug 31 threaded into one extremity of the hollow bolt and provided with a longitudinal perforation 32 adapted to receive a small rod 33 having a threaded end 34 adapted to enter a threaded recess 35 formed in the end of the plunger 28 for the purpose of returning the latter to its normal position after it has been projected by its spring.

Normally, or when the inner tube of the tire is under the proper pressure, the rod 24 is thrust inwardly to cause its extremity 4 to engage a recess 27 of the plunger and lock the latter against movement longitudinally in the hollow bolt, the latter being passed through the hub of the wheel parallel with the axis of the latter. This bolt is held in place in the hub by a nut 36 which is screwed to engagement with the hub on one side while the head 37 of the hollow bolt engages the hub on the opposite side. This bolt is provided interiorly with a groove 38 adapted to receive feathers or tongues 39 formed on the plunger in order to maintain the latter in a uniform position within the bolt so that the recess 27 will always be in position to receive the extremity 4 of the rod. The nut is provided interiorly with a flange 40 which engages the end of the bolt, this flange being slotted as shown at 41 to harmonize with the depth of the groove 38 in the bolt. In applying the nut, it is stopped just before it is screwed home so that the slot 41 is in register with the groove 38 of the bolt. The plunger is then applied by inserting it endwise in the hollow bolt from the end opposite the head. After this is done, the nut is turned sufficiently to throw the slot 41 out of register with the groove 38 thus preventing the plunger from moving farther outwardly than is necessary to cause one of its feather members 39 to engage the flange 40 of the nut.

The outer extremity of the plunger as illustrated in the drawing is equipped with an enlarged head 42 which the nut is recessed, as shown at 43, to receive. This head is cored out as shown at 44 to receive a spiral spring 45, one extremity of which bears on the head of the plunger and the other extremity engages the flange 40 of the nut. This spring 45 coöperates with the spring 49 to project the plunger to the position shown in Fig. 4 when it is released by the outward movement of the rod 25. This auxiliary spring 45 may be used or not as desired, as the single spring 29 may be of sufficient strength for the purpose. The cap 42 of the plunger is connected therewith by means of a reduced threaded part 46 formed on the end of the body of the plunger and entering the threaded recess formed in the cap.

When the plunger is extended as shown in Fig. 4 in full lines and by dotted lines in Fig. 2, it engages the projected extremity 47 of a contact 48 mounted in a sleeve 49 secured to a collar 50 fast on the rear axle 9 of the machine. This sleeve is connected with the collar by means of a hollow bolt 51 which surrounds the sleeve and has a threaded part 52 passing through an opening in the collar 50, a nut 53 being applied to the bolt on the opposite side of the collar from the bolt-head.

The contact 48 is normally held in the projected position by means of a pin 3 which enters a small recess 54 formed in the sleeve, the pin being acted on by a coil spring 56 located in a transverse recess formed in the contact. The recess 54 is of such shape that the pin 3 is caused to disengage it when the plunger 28 is extended, and in this event the contact is actuated to bring it into engagement with an electrode 57 also located within the sleeve 49. This electrode is insulated from the sleeve as shown at 58, and this insulated member circumferentially grooved as shown at 59 to receive a coil-spring 60 which surrounds the electrode and normally has a tendency to hold it in its normal position. The electrode is locked in place within the sleeve by a screw-cap 61. This special construction makes it practicable to move the electrode within its sleeve far enough to restore the contact 48 to its normal position after it has been acted upon by the plunger 28.

Connected with the electrode 57 is an electrical conductor 62 which leads to an incandescent lamp 63 which is connected by a conductor 64 with a conductor 65 from which leads a wire 66 to an electric bell or buzzer 67 from which another wire 68 leads to one pole 69 of a battery 70; from the opposite pole 71 a wire 72 leads to the metal frame of the machine with which it is connected at a point 73 whereby the circuit is closed through one of the lamps and the buzzer or bell when the plunger 28 engages the contact 48, since the said contact is mounted in the metal frame-work of the machine.

As heretofore described the device has been explained in connection with one of the rear wheels of the vehicle. When it is mounted upon a front wheel the construction is the same except with reference to the mounting of the sleeve 49 carrying the electrode 57 and the contact 48. When applied to a forward wheel this sleeve is held by an arm 74 which has a clamping extremity 75, the sleeve being held in place by a screw 76 which is tightened to clamp the sleeve within the split extremity of the arm. The opposite end of this arm is adjustably connected as shown at 77 with an arm 78 rigidly secured as shown at 79 to a projection 80 connected with the hub of the front wheel, the said projection being connected as shown at 81 with a rod 82 of the steering mechanism. By adjusting the member 78 upon the projection 80 and by regulating the relative position of the two members 74 and 78, the sleeve 49 carrying the movable contact and the electrode may always be held in the proper relative position with reference to the plunger 28 carried by either front wheel of the vehicle.

In explaining the electrical circuit, it may be stated that a wire 83 leading from the electrode 57 passes to a lamp 84, whence a wire 85 leads to the wire 65 which is connected by the wire 66 with a bell or buzzer 67 from which leads the wire 68 to one pole of the battery 10, as heretofore explained, the circuit being completed by connecting the opposite poles 71 of the battery with the frame-work of the machine as shown at 73.

From the foregoing description the operation of my improved device will be readily understood.

As soon as the inner tube 17 is softened or the air-pressure therein reduced beyond a predetermined degree, the outer extremity of the rod 24 will be caused to indent the tube as shown in Fig. 6 whereby the plunger 28 will be released and extended by its spring or springs to cause it to strike the exposed extremity 47 of the movable contact whereby the latter is actuated to disengage its pin 53 from the recess 54 whereby the contact is moved into engagement with the electrode 57 closing the circuit through the signaling device, as heretofore explained. When the contact 48 is in engagement with the electrode, the pin 3 is in engagement with a second recess 86 separated from the recess 54 and temporarily holds the contact in its adjusted position. When, however, it is desired to reset the contact, the electrode is moved inwardly against its spring 60 and caused to engage the adjacent extremity of the contact 48, sufficient force being exerted to disengage the pin 3 from the recess 86 and move the contact far enough to cause its point to engage the recess 54 thus restoring the contact to its normal position. Prior to this the plunger is restored to its normal position by the use of the small rod 33 which is threaded into one end of the plunger when the latter is moved endwise within its hollow bolt with sufficient force to move the rod 15 against the inflated inner tube and cause the rod to indent the same until the recess 27 of the plunger is brought into register with the inner end of the rod when the pressure of the tire-tube will throw the inner end of the rod into the recess 27 and again locking the plunger in its normal position.

While I have described the apparatus mounted on the wheel and composed of the rod 15 and the plunger 28 as employed for operating an electrical signal, it must be understood that the said plunger and its rod connection which engages the tire, may be employed to operate a signal of any suitable character. Hence the use of the aforesaid elements is not limited to their employment in connection with any special signal, the intention being as broad in this regard as set forth in the appended claims.

Having thus described my invention, what I claim is:

1. In a combined tire-pressure indicator and electric signal, the combination with the frame-work of the vehicle, an electric circuit and a signal therein, a wheel and its tire, of a spring-pressed plunger transversely arranged in the hub of the wheel, a radially arranged endwise-movable rod, one extremity of which engages the tire while its opposite extremity engages a recess in the plunger and locks the latter against movement until the tire-pressure is reduced beyond a predetermined degree, when the plunger is released, a contact in the path of the released plunger during each revolution of the wheel and adapted to be actuated by the plunger to close the said circuit through the signal.

2. In a combined tire-pressure indicator and electric signal, the combination with the frame-work of the vehicle, an electric circuit and a signal therein, a wheel and its tire, of a spring-pressed plunger transversely arranged in the hub of the wheel, a radially arranged endwise-movable rod, one extremity of which engages the tire while its opposite extremity engages a recess in the plunger and locks the latter against movement until the tire-pressure is reduced beyond a predetermined degree, when the plunger is released, a contact in the path of the released plunger during each revolution of the wheel and adapted to be actuated by the plunger to close the said circuit through the signal, and means for automatically locking the contact in the open-circuit position when the plunger is locked against movement by the rod, and in the closed-circuit position after it has been actuated by the plunger.

3. The combination with the frame-work of a vehicle, an electric circuit, a signal therein, a wheel and its tire, of a spring-pressed plunger transversely arranged in the hub of the wheel, a radially arranged endwise-movable rod, one extremity of which engages the tire while its opposite extremity engages a recess in the plunger and locks the latter against movement until the tire-pressure is reduced beyond a predetermined degree, when the rod moves to release the plunger, a contact mounted in the frame-work of the machine and having one extremity in the path of the plunger when released once during each revolution of the wheel, the extremity of the contact being fashioned to be actuated in an endwise direction by the engagement of the released plunger when rotating with the wheel.

4. The combination with the frame-work of a vehicle, an electric circuit, a signal therein, a wheel and its tire, of a spring-pressed plunger transversely arranged in the hub of the wheel, a radially arranged endwise-movable rod, one extremity of which engages the tire while its opposite extremity engages a recess in the plunger and locks the latter against movement until the tire-pressure is reduced beyond a predetermined degree when the rod moves toward the tire to release the plunger, a contact electrically connected with one pole of the electrical source and arranged to be actuated by the released plunger, and an electrode electrically connected with the other pole of the source, the contact and electrode being in alinement whereby the contact when actuated by the plunger is brought into electrical connection with the electrode to close the circuit.

5. In a tire pressure indicator and signal, the combination with a wheel, its tire and a signal to be operated, of a spring pressed plunger mounted on the wheel, said plunger having an inclined wall, a rod radially mounted on the wheel and having one extremity bearing against the tire, the other extremity being beveled off to form an incline parallel with the said wall of the plunger and resting thereagainst when the pressure in the tire is above a predetermined point to hold the plunger in retracted position, said rod being movable longitudinally, whereby it may be thrust aside by the plunger when the pressure in the tire falls below said predetermined point.

6. In combination, a vehicle frame, a wheel having a pneumatic tire, a closed casing, one part of which is mounted upon the wheel and another part of which is mounted upon the frame, said parts being rotatable with relation to each other, a plunger mounted upon the wheel and extending into the casing, a second plunger mounted upon the frame and extending into the casing, an electric circuit, said second named plunger being adapted to close said circuit when in one position, means controlled by the pressure in the tire for causing said first named plunger to protrude into the path of the second plunger and removable means adapted to be attached to the accessible end of the first named plunger for withdrawing it from the actuated position.

7. In a tire-pressure indicator, the combination with the wheel, its tire, and a signal to be operated, of a spring-pressed plunger mounted on the wheel, a rod mounted radially on the wheel and having one extremity in engagement with the tire, and the other extremity in locking engagement with the plunger when the tire is under a predetermined pressure, and means for moving the rod outwardly to release the plunger when the tire-pressure is reduced, a movable member arranged in the path of the release plunger for operating the signal, means for automatically locking the movable member in the signal-operating position, means for restoring the said movable member to its normal position, and means for automatically locking it in the last named position.

8. In combination with a wheel, and pneumatic tire, a plunger transversely arranged near the hub of the wheel, said plunger having a socket with inclined walls, a rod radially mounted in the wheel having one extremity in engagement with the tire and the opposite extremity beveled off to fit the aforesaid socket, said rod being adapted to be held in engagement with the said socket by a normal tire pressure and a spring adapted, when pressure in the tire falls below a certain predetermined point, to thrust aside said rod and operate the plunger.

In testimony whereof I affix my signature in presence of two witnesses.

CHARLES C. CLEVELAND.

Witnesses:
A. J. O'BRIEN,
A. E. ADAMS.